Feb. 14, 1933. W. E. PENROSE 1,897,859
ROOT CUTTER
Filed July 30, 1932

William E. Penrose
INVENTOR
BY Victor J. Evans & Co.
ATTORNEY

Patented Feb. 14, 1933

1,897,859

UNITED STATES PATENT OFFICE

WILLIAM E. PENROSE, OF CLARKSVILLE, IOWA

ROOT CUTTER

Application filed July 30, 1932. Serial No. 626,731.

The invention relates to a cutter and more especially to a root cutter.

The primary object of the invention is the provision of an implement of this character, wherein roots contained within a sewer may be cut for the removal thereof from the sewer, especially where the latter is made from tile piping and in this manner the said sewer can be readily and easily cleaned to relieve it from obstruction so as to assure proper drainage in the use thereof.

Another object of the invention is the provision of an implement of this character, wherein the construction thereof permits the severing and removal of plant growth or tree roots within sewerage and assures of the cleaning of the sewer for the proper drainage of the same.

A further object of the invention is the provision of an implement of this character which is extremely simple in construction, thoroughly reliable and efficient in its purpose, readily and easily handled, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing.

Similar reference characters indicate corresponding parts throughout the several views in the drawings.

Figure 1:
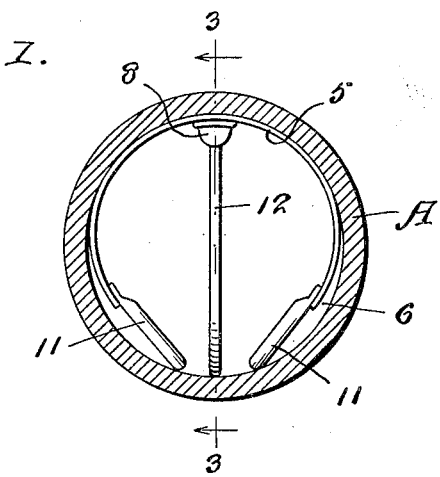
Figure 1 is a vertical transverse sectional view through a sewer pipe showing the implement constructed in accordance with the invention inserted therein.
Figure 2:
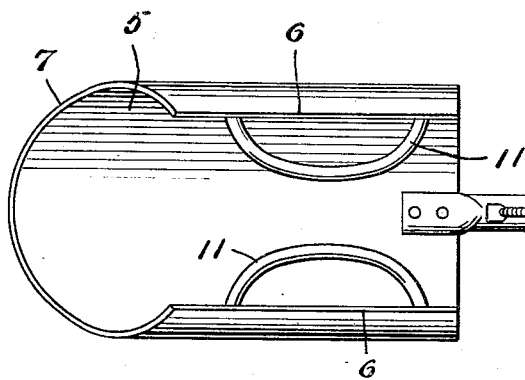
Figure 2 is a plan view of the implement looking from the underside thereof.
Figure 3:
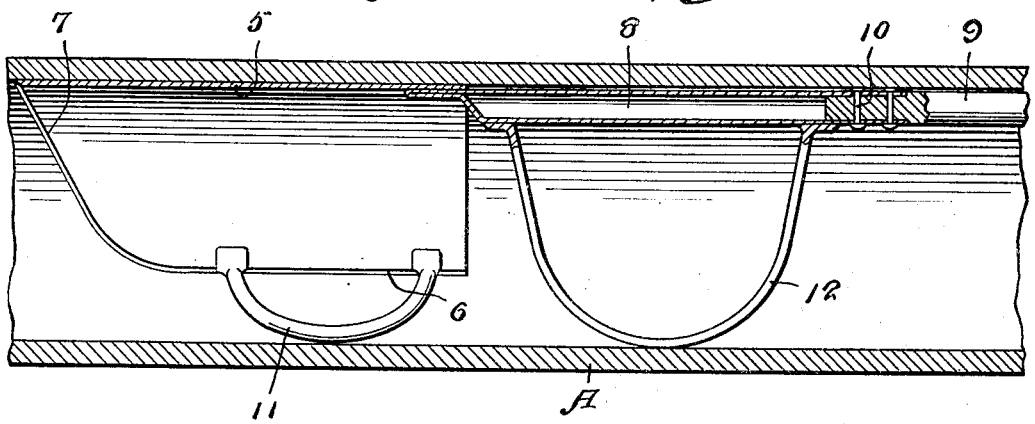
Figure 3 is a fragmentary vertical longitudinal sectional view through a sewer pipe showing the implement therein and in section.

Referring to the drawing in detail, A designates generally a portion of a sewer pipe which is of the tile or terra cotta kind although the material from which the same is made is of no importance and the sewer pipe constitutes no part of the present invention, it being merely illustrated to show the application and manner of use of the implement hereinafter fully described and constituting the present invention.

The implement comprises a blade 5 which is of circular formation in cross section and is provided with the straight edges 6 spaced from each other and parallel with one another while the toe end of said blade is formed with a rearwardly inclined and curved cutting edge 7. The heel end of the blade 5 has centrally fixed thereto a socketed handle receiving tube-like extension 8 in which is fitted the handle 9, the latter being made fast therein by rivets 10 and this handle 9 may be of any desirable length and constructed in sections so that the length thereof may be varied at the option of the user of the implement and to also meet the conditions as confronted in such use of the same.

The blade at the straight or parallel edges on opposite sides thereof has fitted thereto loop-like runners 11 while the socketed extension 8 carriers a trailing runner 12, the same being also of loop formation. This runner 12 is intermediate with respect to the runners 11 and both runners 11 and 12 in the use of the implement permit the free sliding of said implement through a pipe, such as the sewer pipe A, the runners 11 being active to maintain the blade 5 in contact throughout a major portion of its extent with the inner surface of the pipe so that the toe edge 7 will sever any growth, roots or the like therein and thus permitting the easy cleaning of the pipe for the opening of the sewer to free drainage.

The handle 9 may be pushed upon so as to force the blade 5 longitudinally through the pipe A and the close fitting will assure a scraping action of the blade upon the inner surface of the pipe for the removal of obstructions such as plant growth, roots or the like.

What is claimed is:

An implement of the character described comprising a blade of arcuate form in cross section having a rearwardly inclined and curved toe cutting edge, runners carried by the blade, a socketed handle extension centrally of the heel of the blade, a handle engaged in said extension, and a trailer runner on said extension.

WILLIAM E. PENROSE.